S. N. LENNON.

BUGGY TOP.

No. 10,380. Reissued Sept. 11, 1883.

WITNESSES

W. Engel

J. G. Hall Jr

S. N. Lennon INVENTOR

By Thos. T. Hall

ATTORNEY

N. PETERS, Photo-Lithographer, Washington, D. C.

UNITED STATES PATENT OFFICE.

SAYRES N. LENNON, OF CEYLON, OHIO.

BUGGY-TOP.

SPECIFICATION forming part of Reissued Letters Patent No. 10,380, dated September 11, 1883.

Original No. 249,535, dated November 15, 1881. Application for reissue filed June 25, 1883.

*To all whom it may concern:*

Be it known that I, SAYRES N. LENNON, of Ceylon, in the county of Erie and State of Ohio, have invented a new and Improved Adjustable Buggy-Top; and I do hereby declare that the following is a full, clear, and exact description of the same, reference being made to the accompanying drawings, and to the letters of reference marked thereon.

My invention relates to improvements in buggy-tops, and the object of it is to provide an improved adjustable or sliding top for ordinary buggies, whereby the top can be slid back or swung to one side at the will of the person, for the purpose of enabling him to enter or leave the vehicle without obstruction from the top or cover.

Figure 1:
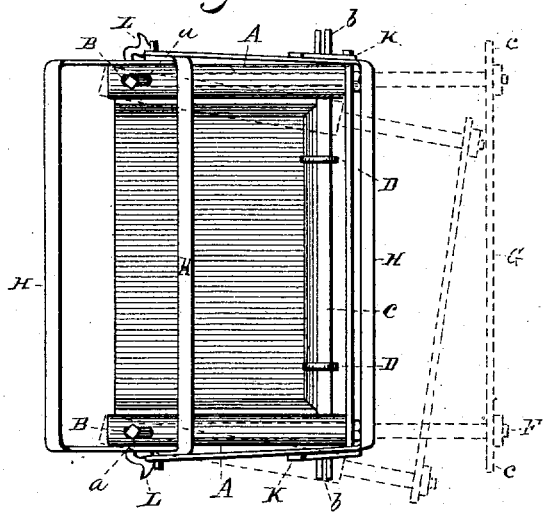
Figure 2:
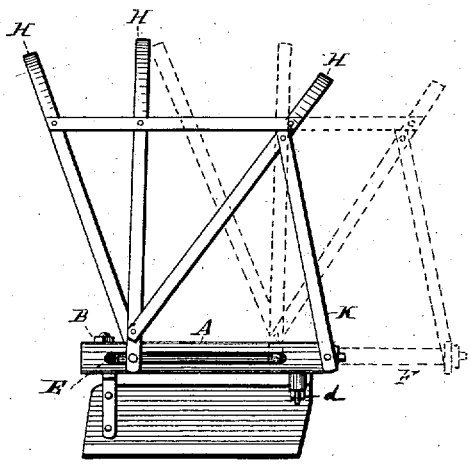

I accomplish my object by means of the appliances illustrated in the accompanying drawings, in which Figure 1 is a plan, and Fig. 2 an elevation, of my improvement.

Similar letters refer to similar parts in both drawings, and the sleeve may be replaced by a rod or any other suitable device.

L L are catches or latches for the purpose of holding in place the top by aid of the sliding rods F F. These can be made of any form desired; but the shape and mode of fastening shown in the drawings will be found to work satisfactory.

A A are two hollow cylinders, attached to the arms of an ordinary buggy-seat by means of studs B B at the front ends. The rear ends are separated and held in place by means of the rod C, which is secured by the eyes or rings D D in such manner as will admit of a limited lateral movement. The cylinders A A are slotted longitudinally nearly their whole length, as shown at E, Fig. 2, and have a circular motion round studs B. They are also fitted on the inside with the rods F, which are bound together at their outer ends by the bar or rod G, Fig. 1, which is secured by nuts and screws, as shown.

H H H, Fig. 2, are bows or frames supporting the cover of the buggy or carriage, the center one being pivoted to the sliding rods F, at E, on the front ends. K K are two props or braces supporting the rear of the top. They are secured at the bottom by being pivoted in arms *c c*. One brace is so shown in Fig. 2. Cylinders A A are provided with catches or latches L L, Fig. 1, for the purpose of securing in place the sliding rods F F. The operation of the mechanism here described is very simple. By springing the catches L L the sliding rods are released, and the whole buggy-top can be shoved back as far as slots E will permit, as shown by the dotted lines in Fig. 2. A person can then enter or leave the buggy without annoyance from the top or cover. The top can then be replaced at pleasure, where it is securely held by the catches L L. When desired, only one side may be moved backward. By loosening the catch on that side, that sliding rod can be moved back, the other sliding rod swinging with its cylinder round its stud B. The inner dotted lines in Fig. 1 represent one sliding rod as drawn out from its cylinder to a greater degree than is the other sliding rod, and the top swung to one side. It is apparent, however, that to swing the top to one side it is not necessary to move but one of the sliding rods backward, as the other sliding rod can swing with its cylinder without being moved longitudinally in it, both cylinders simultaneously swinging in the same direction, though one swings away from the buggy-seat and the other swings toward the buggy-seat. This movement gives room for a person to get in or out the buggy at that side on which the sliding rod is moved back, and the cylinder swung in from the arm of the seat.

Heretofore a carriage-top has been adapted to be slid backward and forward in a right line. Such adjustment of the top necessitates moving the latter bodily to and fro, and requires that both sides of the top should be moved simultaneously and the same distance; also, heretofore a buggy-seat has been pivotally connected to the vehicle-box, thereby permitting the seat and vehicle-top to be jointly swung to one side, as desired. According to my invention, however, the vehicle-seat remains stationary, and the vehicle-top is swung independent of the seat. The two hollow cylinders serve as swinging pieces, respectively located on opposite sides of the vehicle, each swinging piece having its forward extremity pivoted in position. The rod C serves as a support for the rear extremities of said swinging pieces, and the construction of parts is such as to insure free movement on the part of the swinging pieces and on the part of said rear support as the latter travels with said swinging pieces. To this end the studs B fit loosely in the slots *a*, formed longitudinally in the swinging pieces A; also, the rear support, C, has its extremities provided with longitudinal slots *b*, to which depending studs *d*, from the rear extremities of the swinging pieces, are connected, the above construction being in addition to the eyes D, previously mentioned as permitting lateral movement of support C.

It will also be observed that as the seat is swung to either side the support C has longitudinal movement in a line substantially parallel with the seat-back.

The two rods F serve as slides, respectively connected to said swinging pieces, and adapted to have longitudinal movement. The bar G serves as a connecting device between the rear extremities of said slides, the extremities of the bar having the arms *c* for the attachment of the braces K.

Having fully described my improvement, I wish to claim as my invention and desire to secure by Letters Patent—

1. In a buggy or carriage, the combination, with a seat and two swinging pieces respectively pivoted to opposite sides thereof, of two slides respectively connected to said swinging pieces, and devices which connect said slides to the vehicle-top, substantially as set forth.

2. In a buggy or carriage, the combination, with two swinging pieces having their forward extremities respectively pivoted to opposite sides of the seat, and two slides respectively connected to said swinging pieces, of devices which connect said slides to the vehicle-top, and supporting mechanism for the rear extremities of said swinging pieces, substantially as set forth.

3. In a buggy or carriage, the combination, with two swinging pieces pivoted at their forward extremities, respectively, to opposite sides of the seat, and two slides respectively connected to said swinging pieces, of devices which connect said slides to the vehicle-top, and mechanism which connects the rear extremities of the swinging pieces together, said parts being adapted by slots to permit of free movement of the swinging pieces on their respective pivots, substantially as set forth.

4. In a buggy or carriage, the combination, with two swinging pieces having their forward extremities respectively pivoted to opposite sides of the seat, of two slides on which the vehicle-top is mounted, and which are respectively connected to said swinging pieces, the rear extremities of the latter being connected to supporting mechanism adapted to have longitudinal movement in a line substantially parallel with the seat-back as the vehicle-top is swung to either side, substantially as set forth.

5. In a buggy or carriage, the combination, with swinging pieces A A, respectively pivoted to the seat-arms, and sliding rods F F, of means which connect the latter to the vehicle-top, said parts being adapted to permit the vehicle-top to be readily swung to one side, substantially as set forth.

6. The hollow cylinders A A, fitted with sliding rods F F, and slotted in the manner shown at E, pivoted on bolts B, and kept in place by latches L L, and rod or bar G, when attached to the seat of a buggy or other carriage, for the purpose and in the manner above shown.

7. Latches L L, or their equivalents, for the purpose of holding securely the sliding rods F F when pushed forward into place, as set forth and described.

8. In a buggy or carriage, the combination, with a seat and a vehicle-top, of a frame-work which carries the latter and connects it to the seat, said frame-work being pivoted at its forward portion to the seat, and adapted to be swung so as to place the vehicle-top at an oblique angle to the seat, substantially as set forth.

In testimony that I claim the foregoing to be my invention I hereunto set my hand this 15th day of June, 1883.

SAYRES N. LENNON.

Witnesses:

ADDISON H. WINCHELL,
THEODORE ALVORD.